Feb. 5, 1924.
L. A. WINDSOR
1,482,721
FOLDABLE TOURIST BED
Filed June 9, 1922
2 Sheets-Sheet 2
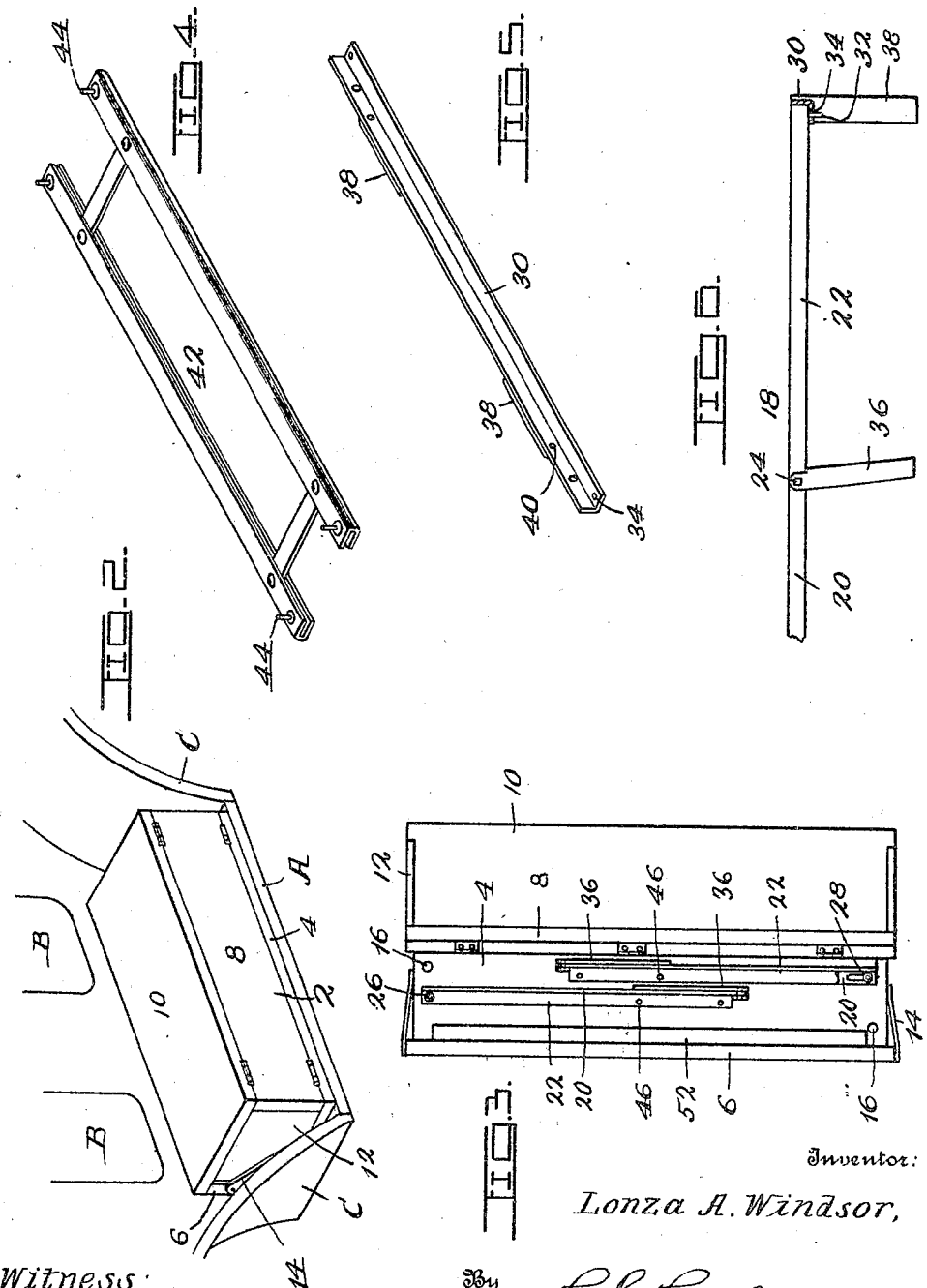
Inventor:
Lonza A. Windsor,
By F. G. Fischer,
Attorney.
Witness:
Fred C. Fischer.

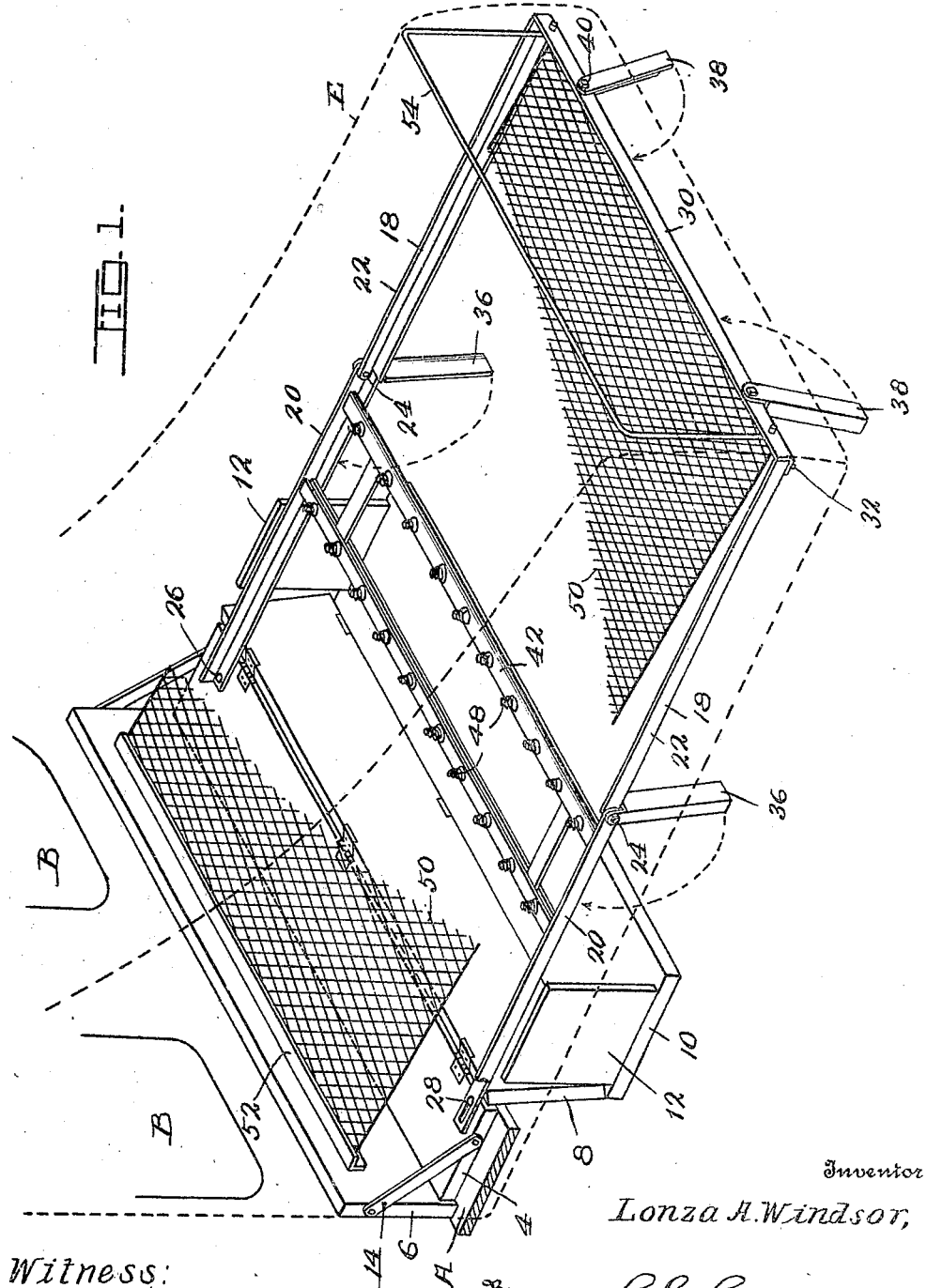

Patented Feb. 5, 1924.

1,482,721

UNITED STATES PATENT OFFICE.

LONZA A. WINDSOR, OF PITTSBURG, KANSAS.

FOLDABLE TOURIST BED.

Application filed June 9, 1922. Serial No. 567,157.

*To all whom it may concern:*

Be it known that I, LONZA A. WINDSOR, a citizen of the United States, residing at Pittsburg, in the county of Crawford and State of Kansas, have invented certain new and useful Improvements in Foldable Tourist Beds, of which the following is a specification.

My invention relates to foldable tourist beds and my objects are to provide a simple, inexpensive and comfortable bed of this character embodying a dust and rain-proof case into which the remainder of the bed can be compactly folded and carried on the running board of an automobile, said case being of such proportions as not to interfere with opening of the doors and getting into and out of the automobile.

A further object is to provide a bed of this character which can be quickly set up for use and is sufficiently flexible to accommodate itself to uneven ground upon which the legs rest, and after such use can be quickly folded and stored within the case where it will be protected from rain in wet weather, or dust in dry weather.

Other objects will hereinafter appear, and in order that the invention may be fully understood, reference will now be had to the accompanying drawings, in which:

Fig. 1 is a broken perspective view of the bed unfolded and mounted upon the running board of an automobile.

Fig. 2 is a perspective view of the bed folded and mounted upon the running board of an automobile.

Fig. 3 is a plan view showing the two side rails of the bed folded within the case which is in open position.

Fig. 4 is an inverted detail perspective view of a transverse supporting member constituting a portion of the bed.

Fig. 5 is a detail perspective view of the detachable foot rail of the bed in a reverse position to that disclosed by Fig. 1.

Fig. 6 is a broken side elevation of a portion of the bed.

Referring now in detail to the different parts, A, designates the running board of an automobile upon which the case 2 forming an important feature of the invention is secured, the height of the case being such as to permit the doors B of the automobile to be opened. The case 2 consists of a bottom wall 4, a back will 6, a front wall 8 hinged at its lower portion to the bottom wall 4, a top wall 10 hinged to the front wall 8, and end walls 12 fixed to the top wall 10. The bottom wall 4 and the back wall 6 are further secured together by braces 14. The bottom wall 4 may be secured to the running board A, in any suitable manner, it being preferably secured by two relatively long bolts 16, which are substituted for two of the shorter bolts usually employed in connecting the ends of the running board A to the fenders C.

18 designates the two side rails of the bed, each consisting of two sections 20 and 22 connected by a pivot 24, so that the rear section 22 may fold into the forward section as disclosed by Fig. 3. One of the side rails 18 is connected at its forward end to the bottom wall 4 of the case 2 by a pivot 26, while the companion side rail 18 has a pin-and-slot connection 28 with said bottom wall 4.

As shown by Figs. 1 and 3, the pivot 26 is spaced farther back from the front edge of the bottom wall 4 than the pin 28. This arrangement permits the side rails 18 when folded to be placed parallel to each other upon said bottom wall 4, so that they will occupy only a minimum amount of space. The pin-and-slot connection 28 permits the associate side rail 18 to be moved to one end of the slot and away from the adjacent end of the bottom 4, as shown by Fig. 3, to allow the adjacent end wall 12 to close upon the bottom wall 4, or allows said associate side rails 18 to be pushed the length of the slot as disclosed by Fig. 1, so that the ends of said side rails 18 will come even with the ends of the companion side rails 18 to receive the foot rail 30 of the bed.

The foot rail 30 is removably secured to the rear ends of the side rails 18 by studs 32, fixed to said side rails 18 and arranged to pass through complemental holes 34 in the foot rail 30, as shown by Fig. 6.

The side rails 18 and the foot rail 30 are provided with foldable legs 36 and 38, respectively, the legs 36 being connected to the side rails 18 by the pivots 24, so that they may fold against the underside of said side rails 18, as indicated by arrows, Fig. 1, and shown in full lines by Fig. 3, while the legs 38 are connected to the foot rail 30 by pivots 40, so that they may fold against the underside of said foot rail as indicated by the arrows Fig. 1, and shown in full lines by Fig. 5.

42 indicates a transverse supporting member comprising a pair of longitudinal bars connected adjacent to their ends by short transverse bars. The supporting member 42 is employed for reinforcing the side rails 18 to which it is removably anchored by studs 44 adapted to pass through complemental holes 46 in the sections 20. The supporting member 42 is provided with upwardly extending bed springs 48 to yieldably support the intermediate portion of a suitable wire matress 50 secured at its rear end to the foot rail 30 and at its forward end to a head rail 52 fixed to the inner upper portion of the back wall 6 of the case 2.

In setting up the bed the case 2 is opened by swinging its top wall 10 downwardly upon the ground. The side rails 18 are then extended and supported by the legs 36 which are unfolded so that their lower ends will rest upon the ground. The side rails 18 are then united by the transverse member 42, after which the rear ends of the side rails 18 are connected by the foot rail 20, which is then supported by unfolding the legs 38, so that their lower ends will rest upon the ground. When connecting the foot rail 30 to the side rails 18 the sections 22 are swung upwardly to permit of some slack in the mattress 50, which is then drawn taut when said sections 22 and the foot rail 30 are lowered to allow the legs 38 to rest upon the ground. When thus opened up for use and provided with blankets the bed presents a comfortable and substantial resting place for one or more persons and it may be covered over when desired with a canvas E supported at one end by the top of the automobile and at the foot of the bed by a U-shaped rod 54 removably secured to the foot rail 30. When the bed is to be folded the canvas cover E and the rod 52 are removed. The foot rail 30 is then disconnected from the side rails 18 which are folded within the box as disclosed by Fig. 3, the supporting member 42 having been previously removed. The supporting member 42 and the foot rail 30 are then placed side by side and rolled up with the mattress 50 to the head rail 52, after which the case 2 is closed to protect the portions of the bed therein from dust and rain. The case 2 may be equipped with any suitable lock to secure it in closed position. The foregoing operations of opening and closing the bed can be easily accomplished in a very short time by one person.

From the foregoing description it will be understood that I have provided a bed embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

A foldable bed consisting of a case adapted to be supported on the running board of an automobile, a head rail fixed to the upper portion of the back wall of the case, a foot rail, a mattress secured at its ends to the head rail and said foot rail and adapted to be rolled upon the latter when the bed is not in use, legs pivoted to the foot rail to fold against the same, side rails hinged intermediate their ends and adapted to fold within the case, studs depending from the rear ends of said side rails and adapted to detachably engage the foot rail, and legs foldably connected to the hinged portions of said side rails.

In testimony whereof I affix my signature, in the persence of two witnesses.

LONZA A. WINDSOR.

Witnesses:
    Roy T. Shaffer,
    Frank Shaffer.